United States Patent [19]

Corbach et al.

[11] 4,155,021
[45] May 15, 1979

[54] SEGMENTAL PERMANENT-MAGNET STATOR MAGNET

[75] Inventors: Rainer Corbach, Olfen, Fed. Rep. of Germany; Klaus Kobelentz, La Grange, Ill.; Adolf Mohr, Bühlertal, Fed. Rep. of Germany

[73] Assignee: Robert Bosch GmbH, Stuttgart, Fed. Rep. of Germany

[21] Appl. No.: 815,074

[22] Filed: Jul. 12, 1977

[30] Foreign Application Priority Data

Aug. 21, 1976 [DE] Fed. Rep. of Germany ....... 2637706

[51] Int. Cl.$^2$ ............................................. H02K 21/26
[52] U.S. Cl. ..................................... 310/154; 310/218
[58] Field of Search ................. 310/218, 154, 43, 153, 310/152, 268

[56] References Cited

U.S. PATENT DOCUMENTS 3,979,619   9/1976   Whiteley .......................... 310/154 X

*Primary Examiner*—Donovan F. Duggan
*Attorney, Agent, or Firm*—Michael J. Striker

[57] ABSTRACT

An electric machine includes a flux-return yoke, a plurality of segmental permanent-magnet stator magnets mounted in the yoke with their outer peripheral surfaces engaging the inner peripheral surface of the flux-return yoke, and a wound rotor mounted for rotation in the space defined by the segmental stator magnets. Either the segmental stator magnets on their outer peripheral surfaces or else the flux-return yoke on its inner peripheral surface is provided with a structured surface portion adapted to properly position the stator magnets relative to the yoke. The structured surface portion has the form of a multitude of projections of identical height arranged in rows to form an array.

27 Claims, 4 Drawing Figures

4,155,021

SEGMENTAL PERMANENT-MAGNET STATOR MAGNET

BACKGROUND OF THE INVENTION

The invention relates to electric machines of the type comprised of a flux-return yoke, a plurality of segmental permanent-magnet stator magnets mounted in the yoke with their outer peripheral surfaces engaging the inner peripheral surface of the flux-return yoke, and a wound rotor mounted for rotation in the space defined by the segmental stator magnets.

Conventionally, the outer peripheral surfaces of such segmental stator magnets are smooth and are cemented or clamped to the inner peripheral surface of the flux-return yoke. If clamping is employed then, in consequence of the complete surface-to-surface contact between the segmental magnets and the yoke, there is an intensive transmission of magnetic forces from the segmental stator magnets to the yoke, and accordingly to the mounting elements of the motor construction. Furthermore, the use of clamping means involves considerable expense with respect to both material and assembly work, increasing the cost of such a machine. In addition, the clamps employed form a parallel path for magnetic flux as a result of which the useful magnetic conductivity of the motor air gap proper is reduced. Still further, electric machines built using this mounting technique very often exibit marked noise effects.

If instead of clamping, the segmental stator magnets are cemented to the inner peripheral surface of the flux-return yoke, the possibility of noise effects can be more and more reduced by employing cement layers of greater and greater thickness. However, as the thickness of the cement layer is increased, the holding action between the segmental magnets and the yoke becomes decreased, so that the motor will not meet low-vibration requirements; in that event, clamps must again be resorted to, i.e., in addition to cementing.

SUMMARY OF THE INVENTION

It is a general object of the invention to provide a novel mounting expedient which is not possessed of the difficulties just described.

This object, and others which will become understandable from the description of preferred embodiments, can be met, according to one advantageous concept of the invention, by providing the outer peripheral surfaces of the segmental stator magnets or the inner peripheral surface of the yoke with integral spacing means operative for properly mounting the segmental stator magnets in the yoke.

In particular, it is advantageous that the integral spacing means be in the form of a structured surface on the outer periphery of the segmental stator magnets or on the inner periphery of the yoke. This structured surface is preferably in the form of a multitude of equal-height projections arranged in rows to form an array of such projections.

If the outer peripheral surfaces of the segmental stator magnets are structured in this way, then the surface engaging the inner peripheral surface of the flux-return yoke will not be a closed, smooth surface; instead, the surface contact between the segmental magnets and the yoke will be only a point-contact or a line-contact. The transmission of force in the frequency ranges encountered during operation of such a machine is reduced as a result of the inventive expedient.

When the segmental magnets are cemented to the flux-return yoke, the increased surface area of the structured surface inherently improves the holding action of the cement.

Due to the point- or line-contact between the outer peripheral surface of the segmental stator magnets and the inner peripheral surface of the yoke, there will be considerable frictional engagement between these surfaces. Consequently, during the cementing operation, there will be a greatly reduced tendency for the segmental stator magnets to slip out of proper position. Likewise, if clamping is employed, there will be a greatly reduced tendency of the magnets to shift during clamping. Accordingly, by maintaining the pole gaps constant, increased symmetry of the magnetic field can be achieved. Due to the increased field symmetry, there is also achieved a reduction in the susceptibility of the machine to generate noise, i.e., in addition to the noise-damping action afforded by a cement layer. The reduced noise tends to increase the lifetime of the machine.

If the wound rotor of the machine is provided with winding slots which are not straight axial slots, but inclined axial slots, then it is of particular advantage that the projections on the structured surface of the stator magnets or yoke being arranged in rows to form a parallelogram-form or rhomboidal array, with each two intersecting rows intersecting at an angle which is symmetrical with respect to the circumferential direction and has a value between 25° and 45°. This counteracts the axial forces which such a rotor would tend to produce.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
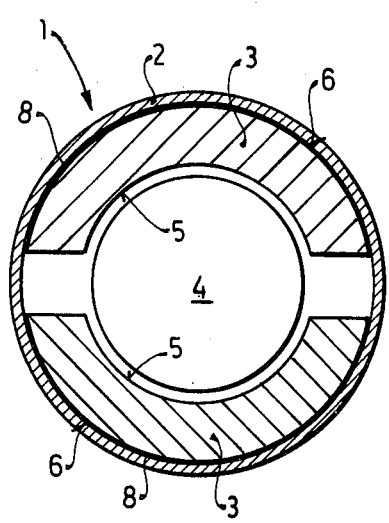
FIG. 1 is a section through an electrical machine of the type in question, the section being taken on a plane normal to the rotor axis of the machine.
Figure 2:
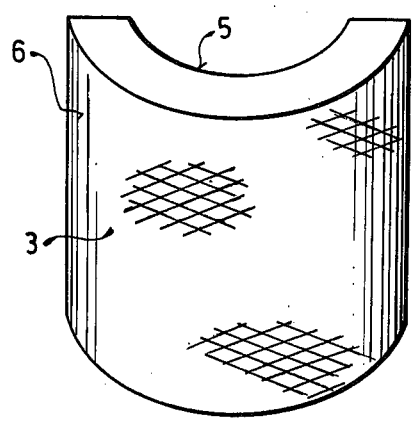
FIG. 2 is a perspective view of one segmental stator magnet.

In FIG. 1, numeral 1 denotes a small D.C. motor, in sectional view, the section being taken on a plane normal to the rotor axis of the motor, the motor 1 includes a flux-return yoke 2 in which are mounted two permanent-magnet segmental stator magnets 3. Mounted for rotation in the space defined by the stator magnets 3, is a schematically depicted wound rotor 4, provided with a plurality of (non-illustrated) straight or inclined axial slots in which a rotor winding is laid.

Each segmental magnet 3 has a cylindrical pole face 5 facing towards the rotor 4 and an outer peripheral surface 6 engaging the inner peripheral surface of the yoke 2. The outer peripheral surface 6, which is cemented to the inner surface of yoke 2, is structured;

alternatively, the inner peripheral surface of the yoke 2 is structured.

Figure 3:
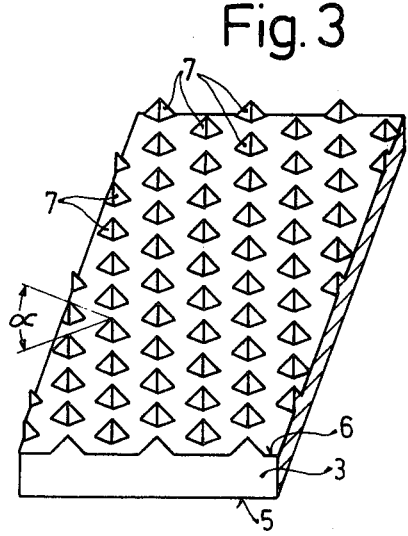
FIGS. 3 and 4 depict two exemplary embodiments of the structure of the outer peripheral surfaces of the segmental stator magnets or the inner peripheral surface of the yoke of the machine.
Figure 4:
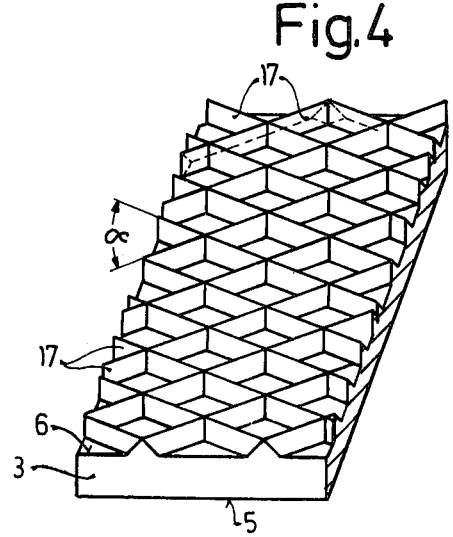

FIGS. 3 and 4 depict two exemplary versions of the structured surface in question. In both these Figures, the structured surface is shown on a greatly enlarged scale.

In the embodiment of FIG. 3, the structured surface is comprised of a base surface from which project a multitude of conical or pyramidal projection 7. The projections 7 are all of identical height, so that their tips imply a cylindrical surface coaxial with the cylindrical base surface from which they project. The projections 7 are arranged in a predetermined array. Preferably, the projections are arranged in straight intersecting rows to form a parallelogram-form or rhomboidal two-dimensional array. If the axial rotor slots for the rotor winding are not straight but instead inclined, then it is advantageous that the intersecting rows of projections intersect at an angle alpha symmetric with respect to the circumferential direction and having a value between 25° and 45°. This minimizes the axial forces which such a rotor will exert upon the segmental stator magnets during motor operation.

If it is the outer peripheral surface of the segmental stator magnets which is structured, then this surface is provided with a cement layer 8, by means of which the magnets 3 are cemented to the inner peripheral surface of flux-return yoke 2. The thickness of the cement layer 8 is so selected that the projections 7 serve as a spacing means between the outer peripheral surface of the stator magnets and the inner peripheral surface of the yoke. The tips of the projections 7 penetrate through the cement layer 8 and come into direct contact with the inner peripheral surface of the yoke 2. Accordingly, with the structured surface shown in FIG. 3, the segmental stator magnets 3 will be in only point-contact with the inner peripheral surface of yoke 2. If the tips of the projections 7 to a certain extent dig into the inner peripheral surface of yoke 2, it is even possible to speak in terms of an interlocking connection between the segmental magnets and the yoke.

The projections 7 increase the effective surface area of the outer peripheral surface 6, and accordingly increase the holding action of the cement layer 8. Additionally, the frictional engagement between the facing peripheral surfaces is increased, so that when cementing there is very little possibility of the segmental magnets slipping. Because the projections 7 serve as spacing means, the pole gaps are maintained constant, making for an improved symmetry of the resultant magnetic field and therefore a reduced tendency of the motor to generate noise. The reduction in noise generation increases the useful lifetime of the motor, particularly of the motor bearings.

The cement layer 8 itself tends to damp the stress to which the stator structure is subjected by magnetic forces. Particularly in the case of rotors having inclined axial slots, which rotors additionally exert axial forces upon the segmental statos magnets, the magnetic-force stressing is particularly well conteracted when the projections 7 are arranged in parallelogram-form or rhomboidal arrays, the resistance to this stressing then occurring in both the axial and the circumferential direction.

FIG. 4 depicts another embodiment of the structured surface in question. Here, the projections have the form of prismatic ribs 17. In this embodiment, likewise, the ribs 17 are all of equal height, so that their tips imply a surface equidistant from the base surface 6. If the inner surface of the yoke 2 or the outer surface of the segmental stator magnets 3 is structured as depicted in FIG. 4, then line-contact between the surfaces in question is established. In FIG. 4, as in FIG. 3, the projections 17 are arranged to form a parallelogram-form or rhomboidal array. The intersecting rows of projections intersect at an angle alpha which is symmetrical with respect to the circumferential direction and has a value between 25° and 45°. The advantages described with respect to FIG. 3 are likewise achieved with the embodiment of FIG. 4.

The inventive expedient can be readily implemented in production, particularly for the case of sintered segmental stator magnets, by forming the patterned structures of FIGS. 3 and 4 from powder to be sintered on filter cloths of corresponding pattern. Production of the segmental magnets using such a forming-sintering technique makes for savings in material during production, makes unnecessary the polishing or other such surface treatment of the outer peripheral surfaces of the magnets, and accordingly eliminates the loss of material which would result during such polishing or other surface treatment.

As indicated above, the structured surface can be either the outer peripheral surface of the segmental magnets or the inner peripheral surface of the yoke; in principle, it would even be possible to structure the facing surfaces of both the stator magnets and the yoke.

It will be understood that each of the elements described above, or two or more together, may also find a useful application in other types of constructions differing from the types described above.

While the invention has been illustrated and described as embodied in a small D.C. motor of particular construction, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A permanent-magnet segmental stator magnet for use in electric machines of the type comprised of a flux-return yoke, at least one segmental permanent-magnet stator magnet mounted on the yoke with its outer surface engaging the inner surface of the flux-return yoke, and wound rotor mounted for rotation in the space defined by the at least one segmental stator magnet, the novel permanent-magnet stator magnet comprising integral spacing means integral with the outer surface thereof for spacing the outer surface of the stator magnet relative to the inner surface of a flux-return yoke.

2. The segmental stator magnet defined in claim 1, the segmental stator magnet having a structured outer surface portion constituting the integral spacing means.

3. The segmental stator magnet defined in claim 2, the structured outer surface portion being comprised by a multitude of projections arranged in a two-dimensional array.

4. The segmental stator magnet defined in claim 3, the array being parallelogram-form or rhomboidal.

5. The segmental stator magnet defined in claim 3, the projections being arranged in straight rows.

6. The segmental stator magnet defined in claim 5, the straight rows intersecting at angles to form a parallelogram-form or rhomboidal array.

7. The segmental stator magnet defined in claim 2, the structured outer surface portion being comprised of a cylindrical base surface and a multitude of identical-height projections projecting therefrom.

8. The segmental stator magnet defined in claim 2, the structured outer surface portion being comprised of a planar base surface and a multitude of identical-height projections projecting therefrom.

9. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the outer surface of the at least one segmental stator magnet relative to the inner surface of the flux-return yoke.

10. A flux-return yoke as defined in claim 9, the flux-return yoke having a structured inner surface portion constituting the integral spacing means.

11. The flux-return yoke defined in claim 10, the structured inner surface portion being comprised by a multitude of projections arranged in a two-dimensional array.

12. The flux-return yoke defined in claim 11, the array being parallelogram-form or rhomboidal.

13. The flux-return yoke defined in claim 11, the projections being arranged in straight rows.

14. The flux-return yoke defined in claim 10, the structured inner surface portion being comprised of a cylindrical base surface and a multitude of identical-height projections projecting therefrom.

15. The flux-return yoke defined in claim 10, the structured inner surface portion being comprised of a planar base surface and a multitude of identical-height projections projecting therefrom.

16. In an electric machine, in combination, a flux-return yoke; at least one segmental permanent-magnet stator magnet mounted on the yoke with its outer surface engaging the inner surface of the flux-return yoke; a wound rotor mounted for rotation in the space defined by the at least one segmental stator magnet; and spacing means located intermediate the flux-return yoke and the at least one segmental stator magnet operative for spacing the outer surface of the latter from the inner surface of the former.

17. The electric machine defined in claim 16, the spacing means comprising integral spacing means on the outer surface of the at least one segmental stator magnet, each stator magnet having a structured outer peripheral surface constituting the integral spacing means.

18. The electric machine defined in claim 16, the spacing means comprising integral spacing means on the inner surface of the flux-return yoke, the flux-return yoke having a structured inner surface constituting the integral spacing means.

19. A permanent-magnet segmental stator magnet for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel permanent-magnet stator magnet comprising integral spacing means on the outer surface thereof for properly positioning the stator magnet relative to such flux-return yoke, the segmental stator magnet having a structured outer surface portion constituting the integral spacing means, the structured outer peripheral surface portion being comprised of a multitude of pyramidal projections.

20. A permanent-magnet segmental stator magnet for use in electric macines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel permanent-magnet stator magnet comprising integral spacing means on the outer surface thereof for properly positioning the stator magnet relative to such flux-return yoke, the segmental stator magnet having a structured outer surface portion constituting the integral spacing means, the structured outer surface portion being comprised of a multitude of conical projections.

21. A permanent-magnet segmental stator magnet for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel permanent-magnet stator magnet comprising integral spacing means on the outer surface thereof for properly positioning the stator magnet relative to such flux-return yoke, the segmental stator magnet having a structured outer surface portion constituting the integral spacing means, the structured outer surface portion being comprised of projections of equal height in the form of prismatic ribs.

22. A permanent-magnet segmental stator magnet for use in electrical machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel permanent-magnet stator magnet comprising integral spacing means on the outer surface thereof for properly positioning the stator magnet relative to such flux-return yoke, the segmental stator magnet having a structured outer surface portion constituting the integral spacing means, the structured outer surface portion being comprised by a multitude of projections arranged in a two-dimensional array, the projections being arranged in rows which intersect one another to form a parallelogram-form or rhomboidal array, each two intersecting rows forming an angle alpha which is symmetric with respect to the circumferential direction of the segmental stator magnet and has a value between 25° and 45°.

23. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the at least one segmental stator magnet relative to the flux-return yoke, the flux-return yoke having a structured inner surface portion constituting the integral spacing means, the structured inner surface portion being comprised of a multitude of pyramidal projections.

24. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the at least one segmental stator magnet relative to the flux-return yoke, the flux-return yoke having a structured inner surface portion constituting the integral spacing means, the structured inner surface portion being comprised of a multitude of conical projections.

25. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the at least one segmental stator magnet relative to the flux-return yoke, the flux-return yoke having a structured inner surface portion constituting the integral spacing means, the structured inner surface portion being comprised of projections of equal height in the form of prismatic ribs.

26. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the at least one segmental stator magnet relative to the flux-return yoke, the flux-return yoke having a structured inner surface portion constituting the integral spacing means, the structured inner surface portion being comprised by a multitude of projections arranged in a two-dimensional array, the projections being arranged in straight rows, the straight rows intersecting at angles to form a parallelogram-form or rhomboidal array.

27. A flux-return yoke for use in electric machines of the type comprised of a flux-return yoke, at least one segmental permanent-magnet stator magnet mounted on the yoke with its outer surface engaging the inner surface of the flux-return yoke, and a wound rotor mounted for rotation in the space defined by the at least one segmental stator magnet, the novel flux-return yoke comprising integral spacing means on the inner surface thereof for properly positioning the at least one segmental stator magnet relative to the flux-return yoke, the flux-return yoke having a structured inner surface portion constituting the integral spacing means, the structured inner surface portion being comprised by a multitude of projections arranged in a two-dimensional array, the projections being arranged in rows which intersect one another to form a parallelogram-form or rhomboidal array, each two intersecting rows forming an angle alpha which is symmetric with respect to the circumferential direction of the flux-return yoke and has a value between 25° and 45°.

* * * * *